April 24, 1928.

Re. 16,944

F. J. THULL

BAG SEWING MACHINE

Original Filed July 17, 1924 3 Sheets-Sheet 1

Inventor

Frank J. Thull,

By

Stuebevant & Marson

Attorneys.

April 24, 1928.

Re. 16,944

F. J. THULL

BAG SEWING MACHINE

Original Filed July 17, 1924 3 Sheets-Sheet 2

Inventor

Frank J. Thull,

By

Hurtevant & Mason

Attorneys.

April 24, 1928. Re. 16,944
F. J. THULL
BAG SEWING MACHINE
Original Filed July 17, 1924 3 Sheets-Sheet 3
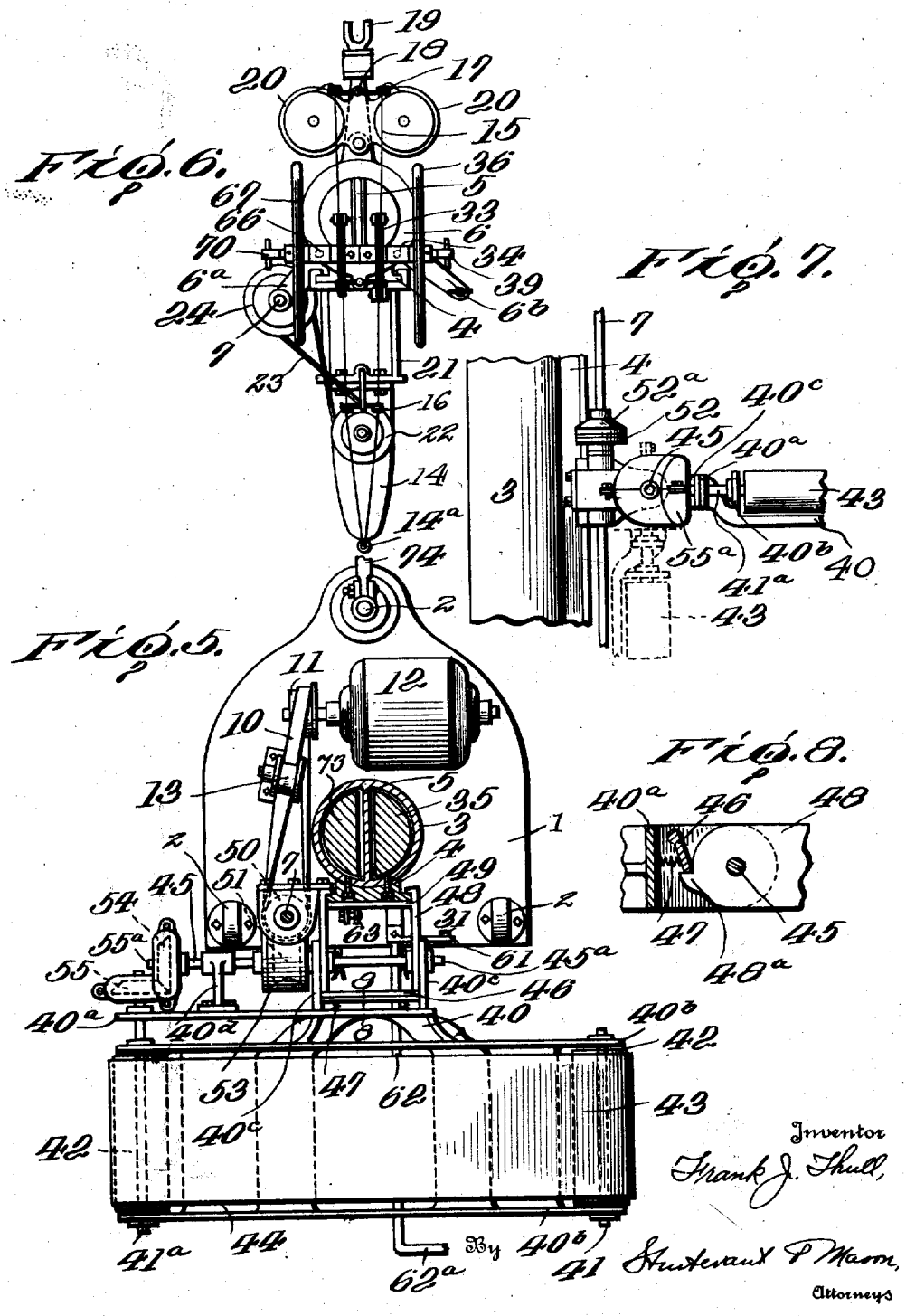
Inventor
Frank J. Thull,
By Hunterwart & Mann,
Attorneys Reissued Apr. 24, 1928.

Re. 16,944

UNITED STATES PATENT OFFICE.

FRANK J. THULL, OF MINNEAPOLIS, MINNESOTA, ASSIGNOR TO UNION SPECIAL MACHINE COMPANY, OF CHICAGO, ILLINOIS, A CORPORATION OF ILLINOIS.

BAG-SEWING MACHINE.

Original No. 1,570,100, dated January 19, 1926, Serial No. 726,501, filed July 17, 1924. Application for reissue filed August 28, 1926. Serial No. 132,291.

This invention relates to a bag tying or bag closing machine, such as now used in flour mills and other factories where the product is placed in bags for sale. As is well known to those skilled in the art, the flour and other similar products are marketed in different sized bags. These bags are now commonly filled in a machine and are then transported to the bag closing machine which sews the top of the bag together or places some closing means thereabout. It is desirable, in order to quickly handle the various sized bags which are of different heights, to have a machine in which the closing means or the supporting means, or both, are vertically adjustable so that said bags can be supported with their tops in proper relation to the closing means.

It is an object of this invention, therefore, to provide a bag closing machine having a vertical guiding column or frame and a bag supporting table comprising a conveyor, which table is vertically movable on said column and which is also swingable about a horizontal axis so that it may be swung down into depending and substantially vertical position.

It is also an object of the invention to provide such a machine having a sewing head thereon or other equivalent bag closing means which is also vertically adjustable on said column and to provide means for driving the said table and its elevator when it is in either its horizontal or vertical position.

It is a further object of the invention to provide such a machine of a portable type which is self-contained and which has a hollow vertical guide column in which counterweights travel which are connected by flexible chain members to the sewing head and table, respectively, and which pass over sprockets at the top of said machine, hand wheels, or other suitable means being provided to traverse said chain members and quickly move the said sewing head and table vertically.

It is still another object of the invention to provide such a bag closing machine having a vertical guiding column and a vertical driving shaft extending along said column, together with a table having a horizontal endless belt or conveyor thereon, which conveyor is driven from said shaft and is vertically movable on said column with said table, the driving connection for said conveyor to said shaft moving along said shaft as the table is moved.

It is a still further object of the invention to provide such a machine as set forth in the preceding paragraph which also has a sewing head or equivalent bag closing means mounted for vertical movement on said column, which, likewise, has a driving connection to said shaft which is movable therealong as said head is moved, together with means for simultaneously throwing into or out of operation both said sewing head and said conveyor on said table.

It is another object of the invention to provide such a bag closing machine comprising a vertical column on which a sewing head or equivalent means is vertically movable and on which a table comprising an endless conveyor, is also vertically movable with means for quickly moving said head or table vertically and holding the same in fixed position.

These and other objects and advantages of the invention will be fully set forth in the following description made in connection with the accompanying drawings in which like reference characters refer to the same parts throughout the different views, and in which Fig. 1 is a view in side elevation of the machine showing a bag thereon in dotted lines;

Fig. 5 is a horizontal section taken on the line 5—5 of Fig. 1, as indicated by the arrows;

Fig. 6 is a top plan view of the machine;

Fig. 7 is a partial view in side elevation showing the table in vertical position in dotted lines, and Fig. 8 is a vertical section taken on the line 8—8 of Fig. 5.

Figure 1:
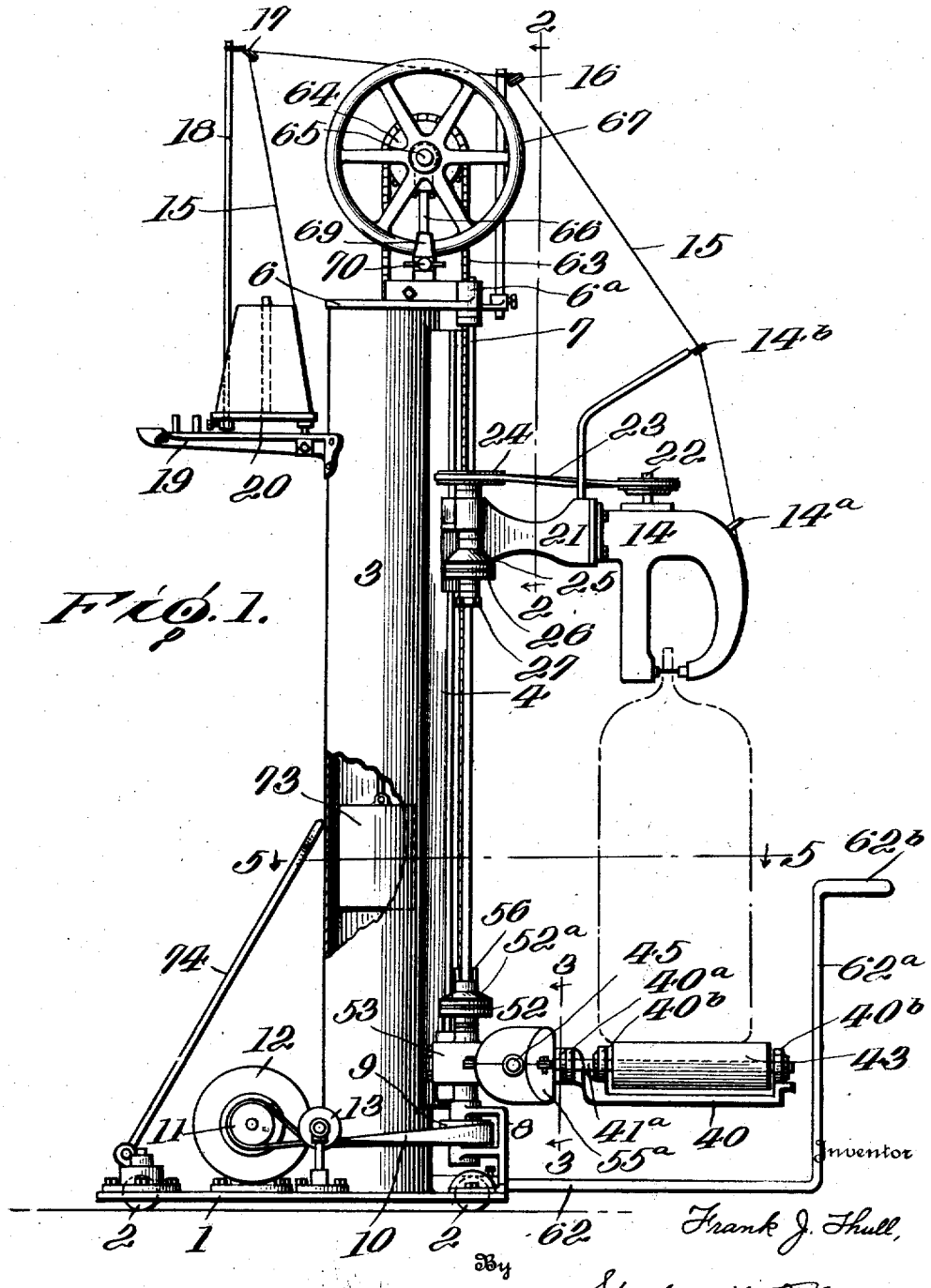
Figure 2:
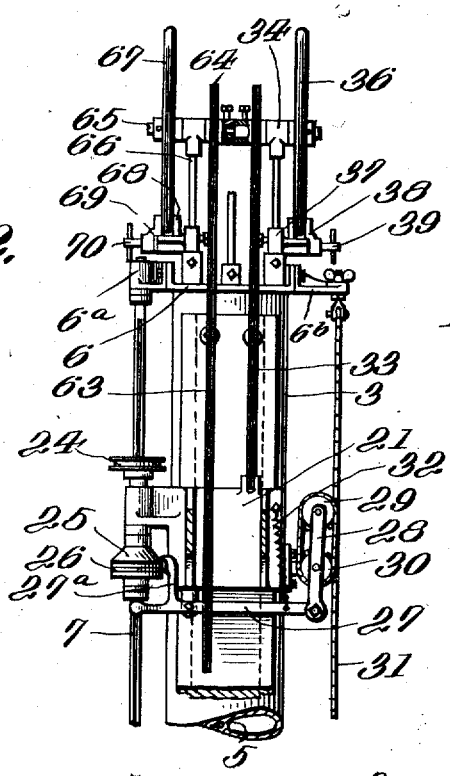
Fig. 2 is a view in vertical section taken on the line 2—2 of Fig. 1.
Figure 4:
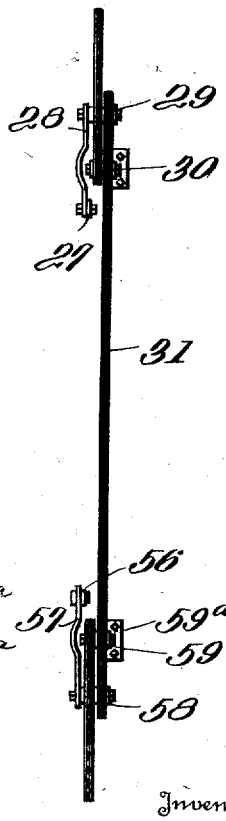
Fig. 4 is a view in side elevation of a portion of Fig. 2 showing a clutch operating means.
Figure 3:
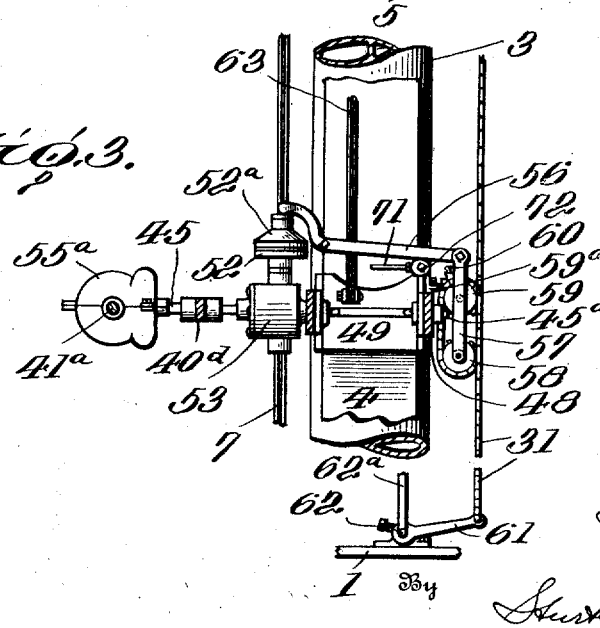
Fig. 3 is a view in vertical section taken on the line 3—3 of Fig. 1.

Referring to the drawings, the machine comprises a base plate or supporting member 1. This base has journaled therein and extending slightly below the same a plurality of supporting wheels or casters 2, one of which is shown at each side of the rear of the base and another of which is disposed centrally of the forward end of the base. A guiding member or column 3 extends vertically from base 1 and has secured to its forward end a T-shaped guiding plate 4. The column 3 is hollow, as shown in Figures 1 and 5 and preferably has a vertical partition 5 extending diametrically forwardly and rearwardly therein. A top member 6 is secured to the column 4, which member has a forwardly and laterally projecting arm 6[a] with a boss thereon forming the upper bearing of a driving shaft 7, which shaft is journaled in spaced bearings in a bracket 8 secured to the base member 1 and upstanding therefrom. The bracket 8 has vertically spaced arms between which and its spaced bearings a pulley 9 is disposed secured to the shaft 7. The pulley 9 is connected by a belt 10 to a pulley 11 secured to the driving shaft of a motor 12 mounted on base 1 and shown as of the common electrical type. The belt 10 runs over a guiding pulley 13 mounted in a suitable bracket secured to the base 1. A head 14 carrying a bag closing means is shown, and while this bag closing means may be of any desired type, in the embodiment of the invention illustrated, the same is shown as representing a sewing head. Said head is supplied with threads 15 running through guiding means 14[a] and 14[b] secured to said head, the guiding means 16 secured to a rod upstanding from a small lug 6[b] projecting forward centrally from top member 6, and a guiding means 17 carried by rod 18 upstanding from a suitable spool carrying bracket 19 secured to the rear of the column 3. The bracket 19 is illustrated as having two spool carriers 20 thereon carrying spools of the thread 15. The sewing head 14 and associated parts of its sewing and thread feeding mechanism may be of any well known and standard type and the same specifically form no part of the present invention and are merely shown diagrammatically. The head 14 is bolted to a rear portion or bracket 21 provided with guiding means fitting about the T-shaped guide plate 4 and is vertically movable along said plate. The edges of the T-shaped guides form spaced vertical guides for the bracket for the sewing head and also for the bracket for the bag support which will be later described, and these spaced guides prevent the brackets supported thereby from tilting laterally on the guides. The sewing mechanism of said head is actuated from a pulley 22 driven by a suitable belt 23 from a pulley 24 slidable on the shaft 7. Pulley 24 is adapted to be connected to and driven by shaft 7 by a clutch member 25 adapted to be brought into contact with a cooperating clutch member 26 which is slidable on said shaft 7, said clutch members being supported by suitable means projecting laterally from said member 21, as shown in Fig. 2. The clutch member 26 is adapted to be engaged to cause the pulley 24 to be driven by an operating lever 27 pivoted to a downwardly extending lug on member 21 and extending to one side of the machine where it is pivotally connected to an upstanding arm 28. The lever 27 has a forked end surrounding shaft 7 and disposed beneath the clutch member 26 and said lever also has an upwardly extending arm 27[a] provided with a friction means adapted to contact the upper side of clutch member 25 when said arm is swung toward said member. The arm 28 has a chain sheave 29 thereon over which passes a clutch operating chain 31 which is adjustably secured at its upper end to an arm 6[b] projecting outwardly from the top member 6. The chain 31 extends downwardly from lug 6[b] around and beneath the sheave 30, then upwardly over the sheave 29 and downwardly therefrom. A coiled tensile spring 32 is secured adjacent one end of lever 27 and to the member 21 normally holding the lower clutch member 26 downwardly with the clutch disengaged. A counter-weighted flexible member shown as a chain 33 is secured to the top of the member 21 and passes vertically upward and over a sheave disposed above the top member 6 mounted on a shaft supported in an upstanding bracket 34 secured to top member 6, which chain then passes downwardly from said sheave and is secured to a counter-weight 35 illustrated as of the shape of the segment of a cylinder, which counter-weight substantially fits in and slides in the column 3 at one side of the partition 5. A hand wheel 36 is secured to the shaft carrying the sheave sprocket over which chain 33 runs, which wheel is adapted to be held in fixed position between an upstanding arm on the bracket 37 mounted in top member 6 and an arm 38 upstanding from a bracket guided for inward and outward movement on a screw 39 provided with a cross handle rod, which screw may be tightened to clamp the rim of wheel 36 between said upstanding arms. It will be seen that the rod supporting bracket 34 is adjustably held in bracket 37 by a suitable set screw and bracket 37 is similarly held in a boss or hub projecting upwardly from the top member 6.

An important feature of the present invention is the vertically movable and swinging table having a conveyor thereon for supporting the bags. This table comprises a frame bracket 40 having a rear horizontal plate member 40[a] and spaced longitudinally extending parallel bars or plates 40[b]. The bars 40[b] carry bearings at each end for shafts 41 and 41[a] upon which are mounted the belt or conveyor supporting rollers 42. A movable member comprising an endless conveyor is shown in the form of a belt 43. The upper run of the belt or conveyor 43 is supported by a suitable deck means 44 extending between the members $40^b$. Plate 40 has rearwardly projecting plate-like ears or lugs $40^c$ thereon pivotally mounted on a pin $45^a$ and said plate also has a bracket $40^d$ bolted thereto having a hub also pivoted on a shaft 45. A plate 46 has pintles at its ends pivotally mounted in the ears $40^c$ and extending therebetween and is urged away from said plate $40^a$ by spaced coiled springs 47, said plate 46 forming a pawl adapted to engage over the teeth or stop lugs $48^a$ formed on the outer side of a pair of arms 48 which project outwardly from a sliding frame or bracket 40 fitting about the guide plate 4. The lugs $48^a$ and the plate 46 form a latching means for holding the table in horizontal position and which is readily releasable to allow the table to swing to vertical position. The pin $45^a$ is mounted in bearings in the arms 48 and is driven from a gear 50 of the worm or spiral type slidable on shaft 7, which gear meshes with another gear 51 of similar type secured to shaft 45. The gear 50 has secured thereto one of a pair of clutch members 52 and $52^a$, the member $52^a$ being splined to the shaft 7. The gears 50 and 51 are enclosed in a suitable gear housing 53, which housing has bearings at each side in which shaft 45 is journaled. The shaft 45 has a beveled gear 54 secured at one end meshing with another beveled gear 55 secured to the rear end of shaft $41^a$, said gears being enclosed in a suitable hood or gear housing $55^a$ which is rotatable on the shaft 45. The shaft 45 is held longitudinally in place by cotter pins extending therethrough adjacent the bearings on arms 48. Clutch member $52^a$ is adapted to be moved into engagement with clutch member 52 by a lever 56 pivoted to an arm upstanding from the bracket 49 and extending to one side of the machine where it has pivotally connected thereto and extending downwardly therefrom, an arm 57. The lever 56 has a fork at its free ends embracing shaft 7 and bearing on top of clutch member 52. The arm 57 has a sheave 58 journaled in its lower end and a sheave 59 is journaled in the bracket $59^a$ secured at one side of the bracket 49, which sheave is disposed a short distance above and to one side of sheave 58. A spring 60 is secured to the lever 56 and to the bracket 49 and normally holds the lever 56 in position with the clutch members 52 and $52^a$ disengaged. The chain 31, already referred to extending downward from sheave 29 also extends downward around and beneath the sheave 58, then upward inside of the same and the sheave 59 over the top of the latter and then downwardly and is removably secured at its lower end to an arm 61 projecting laterally from a shaft 62 mounted in bearings on the base 1. The shaft 62 extends forwardly beneath the table 40 and has connected thereto a lever $62^a$ having an upstanding arm. Said arm has a flat arm $62^b$ projecting outwardly at its upper end adapted to be contacted by the knee or leg of the operator to be operated by hand. A small hand lever 71 is pivotally mounted at one side of bracket 49 and has a small cam 72 secured thereto disposed beneath the lever 56 and adapted to move said lever to engage the clutch members 52 and $52^a$ when the handle 71 is pressed downwardly. The bracket 49 has a flexible member shown as a chain 63 secured thereto, which chain passes upwardly in front of the guide plate 4 and over a sprocket sheave 64 carried on a shaft 65 mounted in a bracket 66 extending upwardly in front of the guide plate 4 and over a sprocket sheave 64 carried on a shaft 65 mounted in a bracket 66 extending upwardly from the top member 6, and said shaft 65 has secured thereto a hand wheel 67, by means of which the sheave 64 may be turned. It will be noted that the shaft 65 is axially alined with the shaft on which is mounted the hand wheel 36 and the inner end of shaft 65 is journaled in the end of the hub of the sheave over which passes the chain 33. A hand wheel 67 is adapted to be clamped between an upstanding arm on a bracket 68 secured by a set screw in a boss upstanding from the top member 6 and an arm upstanding from a bracket 69 guided for inward and outward movement on a screw 70 having a cross rod handle in its outer end. After passing over the sheave 64, chain 63 passes downwardly through top members 6 and is secured to another counter-weight 73 which is also in the form of a segment of a cylinder and slidable at one side of the partition 5 in column 3. The base member 1 is provided with a handle or tongue 74, by means of which the machine can be pulled and transported to different positions.

In operation, the table and sewing head will be adjusted on the guide 4, the bag closing machine will generally be used in connection with the machines in the mill which fill the bags, the latter generally being called the "packers". The bags are delivered from the packer by conveyors and these conveyors are of various heights. It is desirable for efficient handling to have the travelling table on the bag closing machine at substantially the same height as the conveyor on the packer and the height of the conveyor on the packer will usually determine the height of the table 40. The table thus being directly adjusted vertically by moving the hand wheel 67 which moves chain 63 which latter is directly connected to the table, the same will then be held in this position by locking the handwheel by means of the screw 70. The sewing head will now be also directly adjusted vertically by turning the hand-wheel 36, which moves chain 33, which latter is directly connected to said head, said head being adjusted to suit the height of the bag being operated upon. The head will then be locked in the proper position by the screw 39. If the bags are not being received from a packer or other conveyor, the sewing head may be adjusted to the particular operator so that the sewing is done substantially in line with his eyes or slightly below the same, so that the sewing operation can be easily watched. In this case the table 40 will be adjusted to suit the height of the bag being operated upon. Owing to the fact that the head 14 and table 40 are counterweighted they move up and down very easily, the counter-weights moving in column 3. The head 14 and the table 40 being properly positioned, the bag to be sewed will be placed at one end of the carrier or conveyor 43 and the operator will press laterally on the arm 62[b]. This will swing arm 61 downwardly and pull downwardly on the chain 31. This tension on the chain, owing to the fact that sheaves 30 and 59 are stationary, will move sheaves 29 downwardly and sheave 58 upwardly. This will move their respective arms 28 and 57 similarly so that the levers 27 and 56 will be swung and clutch members 25 and 52[a] move, respectively, into engagement with clutch members 26 and 52. Pulley 24 will thus be connected to shaft 7 as will also the gear 50 and the sewing head will be operated and the conveyor 43 driven. The sack is now held at its top at each edge by the operator and traversed laterally so that it moves through the sewing head. As soon as the sack is finished the operator relieves the pressure against arm 62[b] of lever 62[a] and the clutch members are again disengaged and head 14 as well as conveyor 43 ceases to be operated. The sacks can thus be quickly handled and closed. If the operator desires to run the conveyor 43 continuously he may swing the hand lever 71 downwardly and lever 56 will then be permanently held in position to keep one of the members 52 and 52[a] engaged so as to continuously drive the conveyor 43. This may be desirable when the sacks are being supplied to the end of the conveyor in rapid succession.

As above described, the table 40 can thus be quickly moved vertically and positioned for different sized bags. In sewing the largest sizes of bags, the table 40 and the conveyor 43 are not used and during this operation, the pawl plate 46 is disengaged and the table 40 with its attached parts is allowed to swing downwardly, as indicated in dotted lines in Fig. 7. In this movement, the ears 40[c] and bearing 40[a] merely pivot on the shaft 45 and the gear housing 54 also swings about said shaft. When the table is thus disposed in its depending vertical position, the conveyor 43 may still be driven. A great many modern mills have a floor belt or conveyor which runs substantially flush with the floor adjacent the filling or packing machine on which the bags move. In sewing the larger bags the present machine will be moved in position just in the rear of this floor belt so that the same passes under the sewing head 14, shaft 62 being removed. The large bags can then be traversed through the sewing head while moving on said floor belt and it will be noted that these bags will be assisted in their movement by contacting the vertically disposed and moving belt 43 so that the top of the bag will not drag back as it comes through the sewing head. The machine therefore is capable of use with practically all sizes of sacks or bags now in commercial use. This is a great advantage as it has been the practice heretofore to have different machines for sewing different sized bags. The present machine can, of course, be used to sew the larger bags without the use of the floor belt, if desired. In using the machine with the larger bags the operator may press directly on arm 61 or a suitable foot pedal (not shown) may be placed thereon. When it is desired again to place the table 40 in its normal horizontal position it is only necessary to grasp the same and lift it, when the pawl plate 46 will again spring over stop lugs 48[a] and hold the table in its proper position. A universal, very simple, and efficient bag closing machine is thus provided. The machine is of such a height that the operator conveniently can reach the hand wheels 36 and 37 which are made of large size so that a direct and quick traverse of the sewing head and table may be had. The operator can use both hands to hold the bag and operate the starting and stopping clutch by the knee lever 62[a]. The machine can readily be moved from one place to another in the mill or factory by pulling the same about with its handle 74.

From the above description it is seen that applicant has provided a very novel, simple and efficient bag closing machine and one that will have a high degree of utility for the purpose intended.

While machines have previously been provided for conveying the bags through a sewing head, the use of such machines has been quite limited, owing to the small range of movement of the sewing head and table, and the table has not been capable of being swung downward. The present machine makes a practically universal machine and one which can be used with all sizes of bags. It will be noted that the sewing head or table, are both movable throughout practically the whole extent of the vertical guide column and the travelling table can be adjusted quite close to the floor. The table can thus be moved to suit the conveyors on practically all of the packing machines and the sewing head can be moved through a wide range to suit all sizes of bags. As stated, the machine can also be used to sew bags which are moving on a floor conveyor. Such bags previously have required a separate sewing machine. The mounting of both the table and the sewing head on the column renders it possible to conveniently counter-weight the same and to provide the counter-weighting chains and the convenient operating handwheels and locking mechanism. The machine is being commercially used in some of the large flour mills in this country and is proving very successful and efficient. The machine takes the place of several machines of the prior art and is used to serve several different packing machines.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:—

1. A bag closing machine having in combination, a frame comprising a vertical guide column, a head having a bag closing mechanism thereon, and a traveling member vertically movable on said column and disposed below said head, said member being movable to a horizontal and depending vertical position.

2. A bag closing machine having in combination, a frame comprising a vertical guide column, a head having a bag closing mechanism thereon, a table vertically movable on said column and comprising a normally horizontal endless traveling carrier, said table being movable to depending position with said carrier substantially in vertical position, and means for driving said carrier in both positions of said table.

3. A bag closing machine having in combination, a frame comprising a vertical guide column, a driving shaft, a head having a bag closing mechanism thereon mounted on said column, a table comprising a horizontal endless carrier, said mechanism and carrier being driven from said shaft, and said table being swingable to bring said carrier into substantially vertical position, said carrier being driven in both positions of said table.

4. A bag closing machine having in combination, a frame comprising a vertical guide column, a driving shaft extending vertically along said column, a sewing head on said column driven from said shaft, a table vertically movable on said column comprising a horizontally disposed endless carrier driven from said driving shaft, said table being swingable to depending position to bring said carrier into substantially vertical position while continuing the driving of said carrier.

5. A bag sewing machine having in combination, a frame comprising a vertical column, a vertical driving shaft extending along said column, a horizontal shaft in front of said column, a gear slidable on said driving shaft, a gear on said horizontal shaft meshing with said gear, a table pivoted to said horizontal shaft comprising an endless carrier driven from said horizontal shaft, said table and carrier being movable about said horizontal shaft to depending vertical position.

6. The structure set forth in claim 5, a beveled gear on said horizontal shaft, a driving shaft for said carrier at one end thereof, and a beveled gear on said last mentioned shaft meshing with said beveled gear, whereby when said table swings to its depending position, said last-mentioned beveled gear will travel about said first mentioned bevel gear.

7. A bag sewing machine having in combination, a frame comprising a vertical column, a horizontal shaft in front of said column, a bracket mounted for vertical movement on said column, arms projecting outwardly from said column having stop lugs thereon in which arms said horizontal shaft is journaled, a table comprising an endless conveyor having rearwardly projecting lugs pivoted on said shaft and having a resiliently operated pawl member adapted to engage said stop lugs and hold said table in horizontal position, said pawl member being releasable to permit said table to swing downward to substantially vertical position.

8. A bag sewing machine having in combination a column, a vertically movable sewing head thereon, a vertically movable conveyor on said column constructed and arranged to be disposed in horizontal or vertical position, revoluble counterweight carriers at the top of said column, counterweights having flexible supporting means movable over said carriers respectively and respectively connected to said sewing head and conveyor, means for locking said sewing head in different positions on said column, means for locking said conveyor head on said column, driving mechanism for said sewing head and conveyor, and clutch means for controlling said driving mechanism.

9. A bag closing machine comprising a vertical hollow guide column, a vertical partition therein, a head carrying bag closing mechanism vertically movable on said column, a table vertically movable on said column comprising an endless conveyor, a pair of sprockets at the top of said column, counterweights movable in said column at each side of said partition, sprocket chains connected respectively to said counterweights extending respectively over said sprockets and connected, respectively, to said sewing head and table, hand wheels for moving said sprockets and sprocket chains to move said head and table, and means for locking said hand wheels in fixed position.

10. A self-contained bag closing machine comprising a portable base having a vertical guide column rising therefrom, a motor mounted on said base, a vertical driving shaft mounted alongside of said column and driven from said motor, a head having a bag closing mechanism thereon on said column, a swinging table vertically movable on said column comprising an endless conveyor, said head and conveyor being driven from said vertical shaft, counterweights for said head and table movable in said column, and means for moving said head and table, respectively, and holding the same in fixed position.

11. A bag closing machine having in combination a vertical guide column, a head carrying bag closing mechanism vertically slidable on said column, a table vertically slidable on said column and comprising an endless conveyor, a pair of sprockets at the top of said column, counterweights for said head and table respectively, sprocket chains connected respectively to said counterweights and extending respectively over said sprockets and connected respectively to said head and table, hand wheels for moving said sprockets, and sprocket chains to move said head and table whereby said head and table can quickly be moved throughout substantially the whole extent of said column.

12. A bag sewing machine having in combination, a column, a counter-weighted sewing head vertically slidable thereon, a counter weighted conveyor vertically slidable thereon, members respectively connected to said sewing head and conveyor and to the counterweights thereof and movable vertically of said column, means for directly and bodily moving said last mentioned members to move said sewing head and conveyor along said column, said sewing head and conveyor being movable substantially throughout the length of said column, and means for holding said sewing head and conveyor in fixed position.

13. A bag closing machine having in combination, a vertical guide column, a head having a bag closing mechanism vertically adjustable on said column, and a table comprising a traveling conveyor, also vertically adjustable on said column, said column carrying counter-weight chain sprockets, counter weight chains running over said sprockets, and secured, respectively, to said head and table, means for turning said sprockets to traverse said head and table, and means for locking said last-mentioned means in fixed position.

14. A bag sewing machine having in combination, a single vertical guide column having a base adapted to rest on a supporting surface, a head having a bag closing mechanism thereon vertically movable on said column from the top thereof to adjacent the bottom thereof whereby said sewing head may be brought in close proximity to said supporting surface, a table comprising a traveling conveyor movable on said column, from the bottom thereof to adjacent the top thereof, and means for quickly moving said head and conveyor on said column and holding the same in fixed positions thereon.

15. A bag closing machine having in combination, a frame comprising a vertical guide column, a head having a bag closing mechanism thereon vertically movable on said column throughout substantially its whole extent, and a table comprising an endless conveyor also movable on said column throughout substantially its whole extent, said table being pivotally mounted so as to swing downward with said conveyor substantially in vertical position.

16. A bag sewing machine having in combination, a column, a vertically movable sewing head thereon, a vertically movable conveyor on said column, revoluble counterweight carriers at the top of said column, counterweights having flexible supporting means movable over said carriers respectively and respectively connected to said sewing head and conveyor, said carriers being revoluble about a common axis.

17. The structure set forth in claim 16, members revoluble about said axis for operating said head and conveyor, and means for holding said members in locked position.

18. A machine for operating on bags comprising a column, a sewing head on said column, a conveyor normally disposed substantially horizontally for supporting bags and vertically movable on said column, said conveyor being pivoted about a substantially horizontal axis adjacent said column and swingable about said axis into substantially vertical depending position.

19. A portable bag sewing machine adapted to be moved adjacent the floor belt of a mill, said machine having in combination a column, a sewing head vertically slidable on said column, a conveyor for bags vertically slidable on said column and swingable out of vertical alignment with said sewing head so that bags progressed on the floor belt can be sewed by said sewing head, whereby bags of varying sizes may be sewed by said machine.

20. A bag sewing machine comprising a column, a traveling conveyor supported on and vertically movable on said column, and pivoted to swing about a horizontal axis, means for driving said conveyor, a latching means for normally holding said conveyor in horizontal position but being releasable to permit said conveyor to swing downwardly to substantially vertical position while said conveyor is being driven.

21. A portable bag closing machine having in combination, a frame comprising a base and a vertical guide column upstanding therefrom, a driving shaft extending vertically along said column, a head having a bag closing mechanism thereon slidably mounted on said column, a table comprising a horizontal endless carrier slidably mounted on said column, said mechanism and carrier being driven from said shaft, said table and head being movable substantially throughout the whole length of said column, and a motor mounted on said base and operatively connected to the lower end of said shaft.

22. A portable bag closing machine having in combination, a base, a single vertical guide column upstanding therefrom, a head having a bag closing mechanism thereon vertically movable on said column, a table comprising a bag progressing conveyor slidably mounted on said column, said head being movable from the top of said column substantially to the bottom thereof, and said table being movable from the bottom of said column substantially to the top thereof, means carried by said frame for driving said mechanism and conveyor, means for moving said head and table on said column, and means for locking said head and table in various positions.

23. A bag closing machine comprising a base, a guide column extending vertically from said base, a head having a bag closing mechanism mounted on said column and adjustable substantially throughout the whole length thereof, a bag supporting and conveying table mounted on said column and adjustable substantially throughout the whole length thereof, and means for synchronously operating said bag closing mechanism and said bag conveying table, whereby the machine may be adjusted to directly receive and close bags of all standard sizes.

24. A bag sewing machine comprising a supporting frame structure adapted to rest on a supporting surface, a sewing head vertically movable on said frame structure from the top thereof to adjacent the bottom thereof, whereby the sewing head may be brought in close proximity to said supporting surface, a support for the filled bag vertically movable on said supporting frame structure from the bottom thereof to adjacent the top thereof, and means for quickly moving said sewing head and bag support on said supporting frame structure and holding the same in fixed positions thereon.

25. A bag sewing machine comprising a supporting frame structure adapted to rest on a supporting surface, a sewing head vertically movable on said frame structure from the top thereof to adjacent the bottom thereof, whereby the sewing head may be brought in close proximity to said supporting surface, a support for the filled bag vertically movable on said supporting frame structure from the bottom thereof to adjacent the top thereof, and means for quickly moving said sewing head and bag support on said supporting frame structure and holding the same in fixed positions thereon, said support for the filled bag including means whereby the bag may be moved laterally relative to the sewing head for stitching across the bag and closing the same.

26. A bag sewing machine comprising a supporting frame structure including spaced vertical guides, a support for a filled bag mounted for vertical adjustment on said guides, means for adjusting said support, a sewing head mounted for vertical adjustment on said guides and overhanging the bag support, means for adjusting said sewing head, said sewing head and said support being movable substantially throughout the length of said supporting frame so that the range of adjustments of said head and said support overlap each other.

27. A bag closing machine comprising a supporting frame structure adapted to rest on a supporting surface, a sewing head mounted for vertical adjustment on said frame structure from the top thereof to adjacent the bottom thereof, a weight connected to said head for counterbalancing the same, a bag support movable on said supporting frame structure from the bottom thereof to adjacent the top thereof, a weight connected to said bag support for counterbalancing the same, said head and support being movable substantially throughout the length of said frame, and said weights being likewise movable throughout substantially the length of said frame so that the range of adjustments of said head and support, and of the weights, overlap each other.

28. A bag sewing machine comprising a supporting frame structure adapted to rest on a supporting surface, a sewing head vertically movable on said frame structure from the top thereof to adjacent the bottom thereof, a driving shaft extending vertically from the top to the bottom of said frame structure, means operated from said shaft for actuating said sewing head, a traveling conveyor movable on said supporting frame from the bottom thereof to adjacent the top thereof, means operated by said shaft for actuating said traveling conveyor, and means for vertically adjusting said sewing head and vertically adjusting said bag support without disturbing the operating connections between said vertical shaft and said head and between said shaft and said traveling conveyor.

In testimony whereof, I affix my signature.

FRANK J. THULL.